Dec. 24, 1929.  F. H. McCOY  1,740,741
INCUBATOR AND HATCHER
Filed May 19, 1927  4 Sheets-Sheet 1
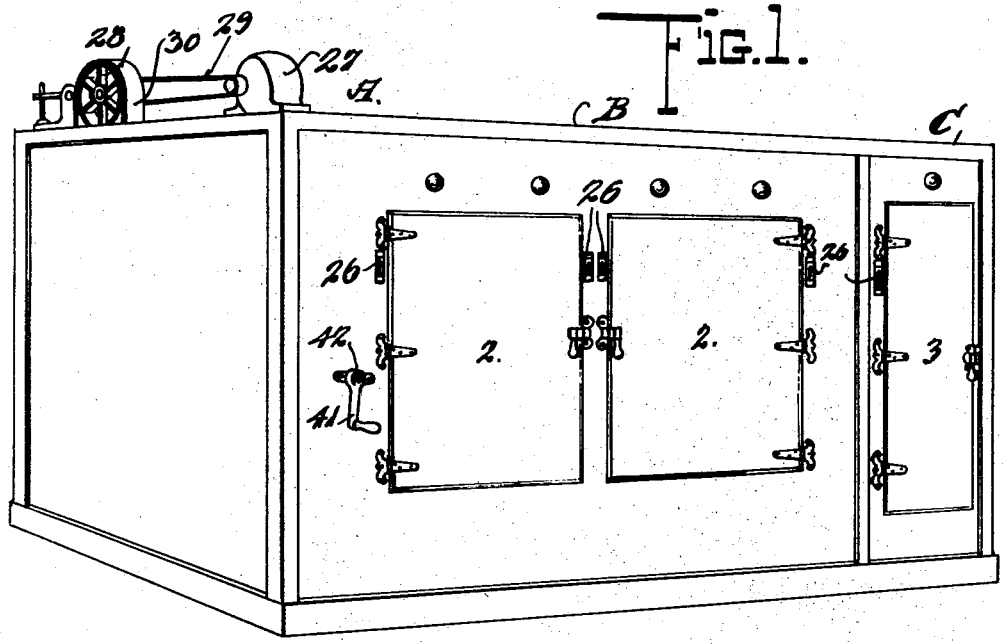
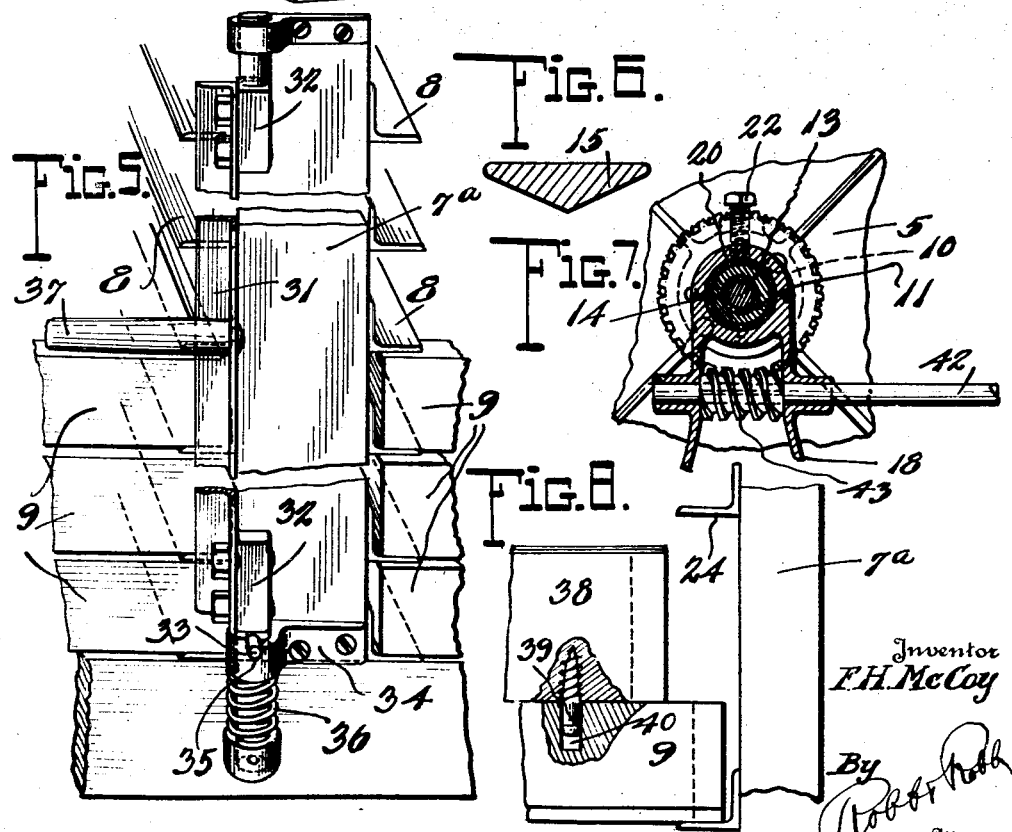
Inventor
F. H. McCoy
By Robert Robb
Attorneys

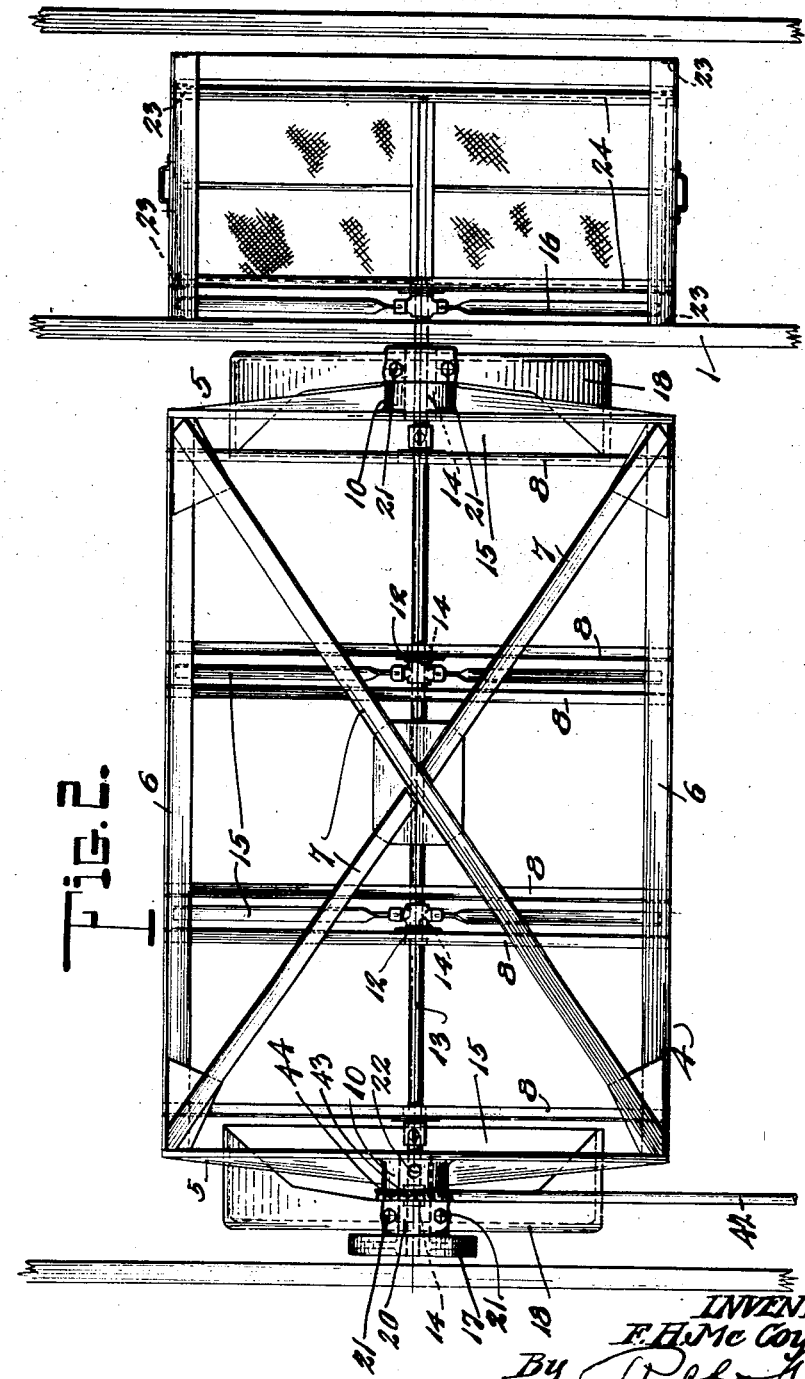

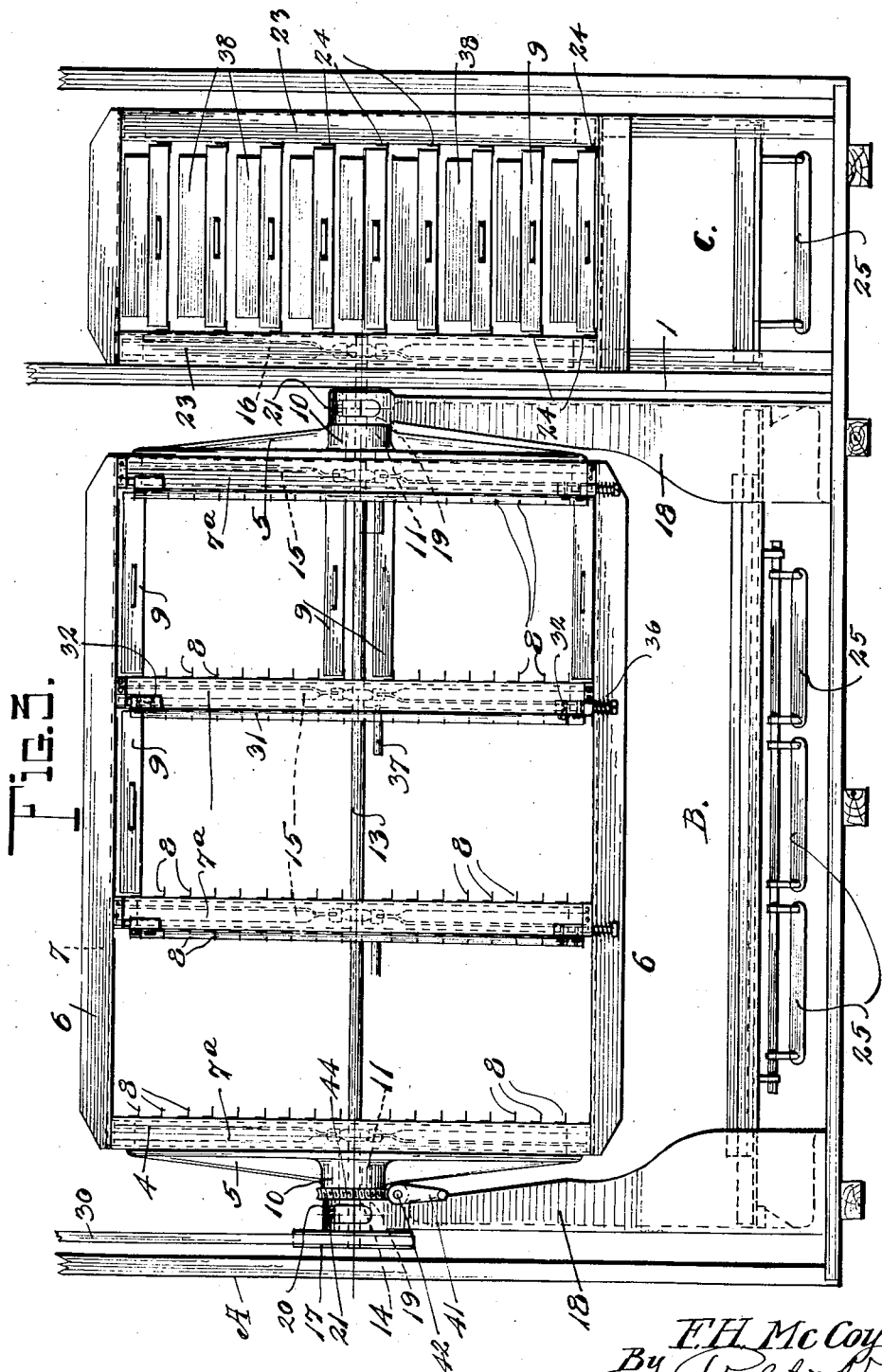

Dec. 24, 1929.                F. H. McCOY                1,740,741
                          INCUBATOR AND HATCHER
                           Filed May 19, 1927        4 Sheets-Sheet 4
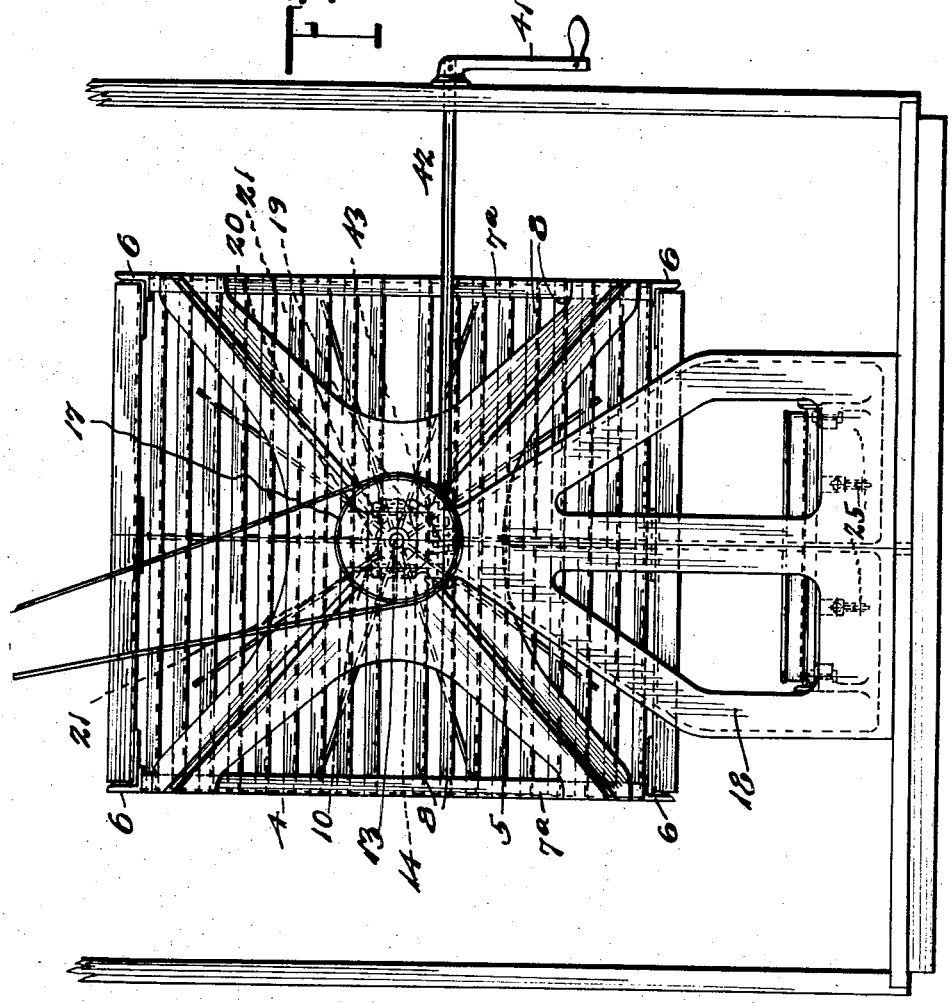
INVENTOR
F.H. McCoy
By Robert Robb
Attorneys Patented Dec. 24, 1929

1,740,741

UNITED STATES PATENT OFFICE

FRANK H. McCOY, OF CLEVELAND, OHIO, ASSIGNOR TO THE McCOY ELECTRIC INCUBATOR COMPANY, OF CLEVELAND, OHIO, A CORPORATION

INCUBATOR AND HATCHER

Application filed May 19, 1927. Serial No. 192,675.

This invention has to do with apparatus or machines for the incubation and hatching of chicks, and one of the special objects of the invention is to produce a unitary machine in which incubation and hatching may be separately carried on under proper conditions.

In the carrying out of my invention, I provide a unitary structure embodying separate incubating and hatching compartments, and utilize a common means for effecting the agitating of air in these compartments for effective heat distributions.

I have also designed a special form of tray receiving carrier or cradle movably mounted in the incubating compartment with means associated therewith for the adjustment of the carrier by angular or turning movements for the requisite shifting of eggs in the trays.

Another unique feature of my invention is the construction of the tray sustaining means within the carrier and also within the hatching compartment, whereby the trays, which hold the eggs and which are disposed in the incubating compartment during incubation, may be moved therefrom into the hatching compartment without displacement of the eggs contained thereby, it only being required that the incubating egg trays be supplied with superposed covers after removal from the carrier and prior to insertion into the hatching compartment.

The invention also includes a special mounting for the carrier or cradle in the incubating compartment with trunnion means through which an operating shaft passes for paddles by which air is agitated in both the incubating and hatching compartments.

My invention also includes locking means, associated with the incubating compartment carrier, for locking in place the trays that may be disposed in the several tray sections of the incubating compartment.

While I described hereinafter the preferred embodiment of my invention, I do not wish to be limited to the exact or specific construction set forth, because, within the purview of the claims forming a part hereof, various modifications of details may be provided in putting my invention in practise.

In the accompanying drawings:—

Figure 1 is a perspective view of an incubator embodying the invention.

Figure 2 is a plan view thereof with parts of the casing removed.

Figure 3 is a side view thereof with parts of the casing removed.

Figure 4 is an end view thereof with parts of the casing removed.

Figure 5 is a fragmentary detailed, perspective view of one of the locking devices, parts being broken away.

Figure 6 is a cross section of one of the air agitating paddles.

Figure 7 is a vertical cross section through one of the carrier journals, contiguous parts being seen in elevation.

Figure 8 is a fragmentary enlarged view in elevation showing the connection between one of the trays and its cover.

A preferred embodiment of the invention, as illustrated in the accompanying drawings, comprehends a casing A, divided into an incubating compartment B and the hatching compartment C, a vertical partition of wood or any equivalent material designated 1, being provided intermediate the two compartments. Doors 2 enable access to the incubating compartment, and a door 3 to the hatching compartment.

As the eggs are in the hatching compartment for only about three days, while they are in the incubating compartment eighteen days, the incubating compartment is designed to hold about six times as many eggs as the hatching compartment, but as the egg trays are provided with covers when in the hatching compartment they take up about twice as much room as they do in the incubating compartment. The incubating compartment, therefore, has a tray capacity of about six times that of the hatching compartment, although the hatching compartment is provided with approximately a double space for each tray in order to accommodate the cover thereof.

Within the incubating compartment, is journalled a carrier framework or cradle 4 for the egg containing trays 9. This framework is of general rectangular construction and preferably consists of two terminal heads or webs 5 connected by longitudinal side bars 6. Cross braces 7, 7 connect the heads 5 at the top and bottom. Vertical bars 7ª connect the side bars 6 at intervals spaced to accommodate trays between bars 7ª, and guiding and supporting angle bars 8 connect bars 7ª to provide supports for the egg-container trays 9. Each tray 9 is free to slide into and out of the carrier 4 along any pair of bars 8 between any two bars 7ª. Bars 8 are spaced vertically approximately the distance of the depth of a tray 9.

Outstanding axially from each of the heads 5 is a tubular hub-like boss 10 into each of which is nested a hollow trunnion 11. Each trunnion 11 is retained against axial or angular movement relative to its respective boss 10 by a set screw or other detachable anchoring means 22. Upstanding from the base or floor of the casing or housing B, at each end and slightly spaced from the respective ends of the carrier 4, is a journal standard 18, each terminating at its upper end in a journal bearing 19, having the usual journal bearing cap 20 retained in place by the bolts 21, 21. Each trunnion 11 extends into and finds bearing within its respective journal bearing 19, so as to provide a rotary mounting for the carrier framework 4. A worm gear 44 is fixed to one of the hollow or sleeve trunnions 11 and is engaged by an actuating worm 43 fixed to the operating shaft 42 journaled transversely in the upper portion of one of the standards 18 just beneath the respective journal bearing thereof and in position for effective intermeshing of the worm and worm gear. The worm gear 44 and its actuating mechanism may be located at either end of the carrier frame 4, but are preferably arranged at the end more remote from the hatching compartment B. The shaft 42 extends from the worm 43 outward through the casing A and at its outer extremity is provided with the crank 41 or other appropriate operating means, preferably manual, for enabling and facilitating angular adjustment of the carrier frame 5 on its bearings for the required periodical variation of the eggs to avoid deterioration incident to gravity. By the mechanism just described, the eggs may be given any degree of angular movement at any time found best adapted to insure proper incubation. Any desired or appropriate limiting stops may be utilized to insure accurate adjustment of the incubator frame or carrier to the required angularity, as by interrupting the possible extent of movement of the handle 41, or otherwise as preferred.

To retain the trays 9 against sliding movement incident to angular adjustment of the incubator carrier 4, a locking device is provided for each column of trays and consists essentially of an angle bar 31 upstanding alongside the respective upright 7ª and pivoted or journalled to rotate or swing substantially axially, to and from a position where at one of its webs engages a part of the exposed end of each tray 9. The specific form of mounting of each bar 31 is susceptible of a wide range of variation but a desirable form is illustrated in the accompanying drawings consisting of journal pieces 32, 32 bolted or otherwise fixed to the end portions of the bar 31 and outstanding substantially longitudinally thereof, into appropriate journal bearings 34 carried by the respective adjacent upright 7ª. The lower journal piece 32 is provided with an outstanding pin 33 designed to rest in a notch 35 formed in the lower journal bearing 34. The trunnion or journal formed from the lower block 32 extends through the lower journal bearing 34 and is headed at 32 and surrounded by a coiled spring 36 between the head 32 and the journal bearing 34, stressing the bar 31 downward and thus ensuring retention of the pin 33 in the notch 35, except when lifted out of the notch by a positive operating action. To facilitate such action, the handle 37 is fixed to the bar 31. It will be readily understood that after a tray or group of trays is positioned in one of the several columns of the incubator carrier 4, the operator swings the handle 37 to bring the outstanding flange of bar 31 around to a position engaging the exposed ends of the tray 9, and on reaching this position, the pin 33 drops to its locking engagement in notch 35 and the parts remain thus until it is desired to remove a tray from the particular column. When this time arrives, the operator, grasping the handle 37, lifts and swings or pivots the respective angle bar 31 in substantially one movement so as to remove the locking web of the bar from the path of the particular column of trays. A pin 33 merely rests on the edge of the lower journal bearing 34 while the bar 31 is in its open or tray non-engaging position. The handle 37 is preferably fixed to the bar 31 in position to lie along-side the end of the tray when the parts are locked, so as not to occasion an outstanding projection.

Within the housing or casing referred to above as the hatching compartment C is arranged a stationary framework of shelving similar to the shelving of the rotary frame or carrier 4 in so far as accommodtaion of trays is concerned. Said framework in the compartment C consists of appropriate uprights 23, 23 connected by horizontal angle bars 24 whose outstanding horizontal flanges afford a sliding support for the trays. The bars 24, however, are spaced apart vertically, approximately twice the distance of the vertical spacing of any two of the bars 8 in order to accommodate both a tray 9 and a covering tray 38 on each pair of bars 24. The covering tray 38 is quite similar in construction to and is adapted to snugly fit upon a tray 9 and to have its edges coincident therewith and resting thereupon. Appropriate dowels 39 extend downward from each tray 38 into corresponding mortises 40 opening through the upper edge of the margins of the respective tray 9. The covering trays 38 are utilized in the hatcher to afford head room and freedom for movement of the chicks as they are being hatched.

It is to be particularly noted that the spacing for the trays 9 in both the carrier 4 and the hatcher is the same throughout so that all trays 9 are readily interchangeable. No difficulty or confusion may arise such as could occur incident to trays constructed as "rights" and "lefts" or certain trays of special sizes.

The capacity of the hatching compartment relative to the incubating compartment is preferably proportioned for substantially continuous hatching operations, incident to a stepped relation in the progress of incubation. That is to say, it is desirable to assure removal of the eggs from the incubating carrier before any one of them hatches out, and a safe margin may be assumed to be three days before the hatching is actually due. Therefore, counting twenty-one days for full incubation and calculating on a three day margin of safety for transfer from the incubating carrier 4 to the hatching compartment, the hatching compartment tray accommodation should be approximately one-sixth of the capacity of the incubating carrier 4. Many variations may be allowed for possible special conditions, but generally speaking, this relative proportion of capacity is preferred, and in utilizing the invention, it is preferable to first charge the incubating carrier with trays of eggs in a number corresponding to the number of trays which may be accommodated by the hatching compartment. After three days, a second group of trays similar in number to the first group is supplied and so on every three days, until on the eighteenth day, a group of trays is ready to be withdrawn from the incubating carrier and inserted into the hatching compartment and a fresh group of trays inserted in the incubating carrier in lieu of the one first transferred. After that, a group of trays will be transferred every three days, the oldest group being removed from the carrier to the hatching compartment and a fresh group taking its place. Thus, the machine is operated at full capacity constantly. It is understood, of course, that only one set of tray covers 35 is required, and that the covers are removed when the chicks are ready to be withdrawn from the hatching compartment and re-used on the fresh batch of trays, the trays removed from the hatching compartment being supplied with fresh eggs as the next batch of trays for insertion in the incubator in regular rotation.

Heat is supplied to the incubator and hatching compartments from any appropriate source, preferably that of electric heaters 25, 25, and the temperature is carefully regulated for obtaining the best results. Thermostatic control of the current to the heaters, may of course, be utilized.

It is desirable also to uniformly distribute heat by agitating the air both in the incubator compartment and in the hatching compartment, and to this end, a shaft 13 is arranged coaxially with and extending throughout the length of the incubator carrier 4, extending from beyond one end of said carrier, throughout the carrier, beyond the other end thereof, and into the hatching compartment. Appropriate paddles 15 and 16 are fixed to the shaft 14 at various points in its length for insuring a gentle agitation of air incident to slow rotation of the shaft. Each blade 15 and 16 is preferably constructed in cross section, as shown in Figure 6, with a double bevel to insure movements of the air in all directions to aid in the even distribution of the heat. The shaft is preferably mounted on any appropriate anti-friction bearings carried by certain of the cross bars connecting the uprights 7ª. The shaft 13 being coaxial with and extending through the hub-like bosses 10 and through the trunnions 11, is preferably sustained at the hubs by appropriate anti-friction bearings 14 disposed between the respective trunnion 11 and the shaft 13. Also at this point, anti-friction bearings 14' are preferably utilized between the respective tubular trunnion 11 and its journal bearing 19. Power may be supplied to the shaft 13 in any appropriate manner, as for example by the fixing of a pulley 17 to an accessible terminal extension of the shaft and delivering power to a pulley through a belt 30 extending through the roof of the casing A and receiving power from a driving pulley 28, actuated by a shaft 29, driven by an electric motor or other appropriate source of power 27.

Having thus described my invention, what I claim as new and desire to secure by Letters Patent of the United States, is:—

1. In incubating apparatus, the combination of a carrier frame adapted to receive trays of eggs, a journal for the frame on which the frame is adapted to be adjusted angularly, air agitating means within the frame, and means for delivering power through the journal to the air agitating means.

2. The combination as specified in claim 1 in which the power delivering means is a shaft extending through the journal and mounted to rotate independently of the journal.

3. The combination as specified in claim 1 in which the air agitating means includes a paddle having two inclined facets facing in the same general direction and inclined in opposite directions.

4. In incubating apparatus, the combination with a carrier frame adapted to receive trays of eggs, tubular terminal trunnions outstanding from said frame, a journal bearing for each of said trunnions, a supporting standard for each journal bearing, air agitating means for the carrier, and means for delivering power through one of the tubular trunnions to said air agitating means.

5. In incubating apparatus, the combination with a carrier frame adapted to receive trays of eggs, tubular terminal trunnions outstanding from said frame, a journal bearing for each of said trunnions, a supporting standard for each journal bearing, air agitating means for the carrier, means for delivering power through one of the tubular trunnions to said air agitating means, and means carried by one of the standards for shifting the carrier frame angularly on its trunnions.

6. In incubating apparatus, a carrier frame comprising horizontal edge bars, top and bottom struts connecting the terminals of the respective parts of the top and bottom edge bars, uprights connecting the edge bars vertically and dividing the space into tiers, flanged cross bars connecting the uprights and providing flanges off-standing to slidingly receive and support egg containing trays, terminal webs fixed to the uprights at the ends of said edge bars, a supporting standard upstanding alongside each of said end webs, a journal connection between each of said end webs and the respective standard, and means extending through one of the journals for agitating air within said carrier frame.

7. In incubating apparatus, the combination of a carrier, comprising horizontal edge bars, top and bottom struts connecting the terminals of the respective parts of the top and bottom edge bars, uprights connecting the edge bars vertically and dividing the space into tiers, flanged cross bars connecting the uprights and providing flanges off-standing to slidingly receive and support egg containing trays, terminal webs fixed to the uprights at the ends of said edge bars, a supporting standard upstanding alongside each of said end webs, a journal connection between each of said end webs and the respective standard, and means for agitating air within said carrier frame, with means functioning through one of said journals for actuating the agitating means.

8. In incubating apparatus, the combination, with supporting means for slidingly sustaining a tier of egg trays, of a pivotally mounted bar located to move upon its pivot to and from a position across the path of the trays when sliding to or from position on the sustaining means, a pin outstanding from the bar, locking means adapted to cooperate with said pin to lock the bar in position with its web across said path, and resilient means urging the pin to its locking position.

9. An incubator comprising a casing, an egg tray supporting device mounted for rotation about a horizontal axis and means for circulating air between the trays so as to maintain a uniform temperature, said means comprising a propeller mounted for rotation about the axis on which the supporting device is mounted and means for rotating the propeller without moving the supporting device.

10. In incubating apparatus, the combination of an incubating carrier adapted to removably receive trays of eggs, trunnions outstanding from the terminals of said carrier, journal bearings sustaining said trunnions, means for angularly adjusting said carrier on its trunnions, one of said trunnions being tubular, and air agitating means operable through said tubular trunnion.

In testimony whereof I affix my signature.

FRANK H. McCOY.